United States Patent Office.

ISAAC P. WENDELL, OF PHILADELPHIA, PENNSYLVANIA, ASSIGNOR TO THEODORE P. MATTHEWS, OF SAME PLACE.

COMPOSITION OF MATTER FOR JOURNAL-BEARINGS.

SPECIFICATION forming part of Letters Patent No. 368,634, dated August 23, 1887.

Application filed November 9, 1886. Serial No. 218,434. (No specimens.)

*To all whom it may concern:*

Be it known that I, ISAAC P. WENDELL, a citizen of the United States, residing in the city of Philadelphia and State of Pennsylvania, have invented certain new and useful Improvements in a Composition of Matter for Journal-Bearings, of which the following is a specification.

My invention relates to that class of lubricating and anti-friction compositions especially adapted for use in connection with all journals and bearings, whether large or small; and my invention consists of a combination of ingredients assembled in the manner hereinafter set forth.

In preparing my improved lubricating and anti-friction material I first make a mixture as follows: Linseed oil and litharge are boiled together until the substance is dry or hard, when it is ground, and of the powder thus formed I take two parts and combine with it wood fiber, twelve parts; powdered asbestus, twelve parts; borax, one part; flowers of sulphur, one part; plumbago, fifteen parts.

The above ingredients are thoroughly mixed together in the form of a powder, and after they are intimately combined six parts of asbestus in a fibrous form are thoroughly mixed with the materials. I then prepare a liquid binding mixture consisting of glue solution, (one-fourth of a pound of glue to a pint of water,) thirteen and one-half parts; solution of gum-sandarac and gum-mastic, thirteen and one-half parts.

In making the gum solution I take one ounce of gum-sandarac, one ounce of gum-mastic, one pint of alcohol, and one ounce of spirits of turpentine.

The glue solution and the gum solution are thoroughly mixed by heating them nearly to the boiling-point and stirring, after which they are added to the dry mixture above described until the whole is thoroughly incorporated, forming a plastic mass which can be pressed and molded into any required form, and will then harden either with or without the use of artificial heat and with or without subjecting the same to any pressure, and will present a bearing-surface both very smooth and lubricant, which offers little or no friction to the journal, and will neither heat nor gum.

I do not confine myself strictly to the proportions named, as I have found that all of them may be varied within certain limits and yet produce an effective lubricating and anti-friction bearing; nor is it essential to make the gum solution precisely as described; but I have found in practice that the best results are secured by the combinations in the proportion above set forth.

I claim—

1. A composition of matter consisting of linseed-oil and litharge dried and powdered as described, wood fiber, asbestus, borax, flowers of sulphur, plumbago, and a binding material consisting of glue and gum, all substantially as set forth.

2. A composition of matter consisting of linseed-oil and litharge dried substantially as described, wood fiber, asbestus in a fibrous condition, borax, flowers of sulphur, plumbago, and a binding material consisting of glue, gum-sandarac, and gum-mastic, all substantially as described.

In testimony whereof I have signed my name to this specification in the presence of two subscribing witnesses.

ISAAC P. WENDELL.

Witnesses:
WILLIAM R. CASON,
THEO. P. MATTHEWS.